Sept. 30, 1969 R. E. ROHRER 3,470,474
UNDERGROUND RADIO COMMUNICATION SYSTEM FOR HIGHWAYS
Filed Dec. 23, 1966 2 Sheets-Sheet 1

INVENTOR
RAYMOND E. ROHRER

BY Rupert J. Brady
ATTORNEY

UNDERGROUND RADIO COMMUNICATION SYSTEM FOR HIGHWAYS

Filed Dec. 23, 1966 2 Sheets-Sheet 2

INVENTOR
RAYMOND E. ROHRER

BY Rupert J. Brady
ATTORNEY

United States Patent Office 3,470,474
Patented Sept. 30, 1969

3,470,474
UNDERGROUND RADIO COMMUNICATION SYSTEM FOR HIGHWAYS

Raymond E. Rohrer, Silver Spring, Md., assignor of eighty-five percent to Donald E. Bilger, Fairfax, Va., and fifteen percent to David A. Rawley, High Point, N.C.

Filed Dec. 23, 1966, Ser. No. 604,480
Int. Cl. H04b 7/04
U.S. Cl. 325—51 14 Claims

ABSTRACT OF THE DISCLOSURE

A sectionalized communication system for highways having radiating antenna elements disposed underground and beneath the road surface on opposite sides of each traffic lane, that is, on opposite sides of the highway and between adjacent traffic lanes of the highway, with means producing signals on adjacent radiating antenna elements in phase relation to each other to provide sufficient field strength across the highway for efficient radio transmission to vehicles traveling in the traffic lanes, and a field attenuated to a level which satisfies the requirements of the Federal Communications Commission outside the immediate vicinity of the highway.

CROSS-REFERENCE TO RELATED APPLICATION

Copending application Ser. No. 537,350, filed Mar. 25, 1966, by John R. McKenna, for Highway Radio Communications System, owned by the same assignees as the present application, is related to the present application in that the overall purpose and end results of the inventions of the applications are the same, but the means for obtaining the end results are substantially different.

BACKGROUND OF THE INVENTION

This invention relates to that class of radio wave communication system which utilizes antennas buried underground or beneath the surface of a roadway to provide radio communication with vehicles traveling on the roadway.

The prior art contains radio communication systems for highways which contemplate burying the radio communication transmission line, which functions as a radiating antenna in the media strip of a divided highway or in the center of the highway itself for transmitting messages to vehicles moving along the highway to alert the driver as to various road conditions—weather, traffic, and the like—which the vehicle will encounter. Other systems utilize telephone and power transmission lines running along one edge of the highway, while still other systems use various other types of antenna means, such as simple loop antennas, selectively positioned along the highway route for communicating with the passing vehicles. However, all of these known prior art systems suffer from an inherent limitation insofar as actual use is concerned due to the fact that such systems either transmit too little power or fail to meet the requirements spelled out in the Rules and Regulations of the Federal Communications Commission (F.C.C.). The Rules and Regulations of the F.C.C., as presently written, make no provision for a highway radio service. Consequently, this operation must be in accordance with Part 15 of the Commissioner's Rule which concerns unlicensed radiation. The regulations of Part 15 place stringent limitations on the amount of permissible radiation. The maximum amount of radiated energy is expressed by formulae in which the reference distance is 100 feet. While radiation is permitted throughout the spectrum, the region of present interest is the standard broadcast band where the maximum signal strength, at the aforesaid 100 foot distance, is equal to 24,000 (microvolts per meter frequency in kilocycles per second). The permissible level of radiation in the standard broadcast band varies over approximately a 3 to 1 range, depending upon the emission frequency. It can be seen that for maximum signal strength, the operating frequency should be as low as possible; however, the present standard broadcast band prohibits frequency allocations lower than 535 kilocycles. Assuming operation around 635 kilocycles, the permissible radiation at one hundred feet away from the radiator is 24,000/635=37.8 microvolts per meter. This radiation level increases linearly as the distance decreases, doubling as the spacing is reduced to fifty feet and increasing ten-fold when the interval is reduced to ten feet.

The sensitivity of the poorest quality auto radio receivers and the normal varying ambient noise levels along the route determines the lowest values of signal which will provide acceptable listenable service. It is obviously desirable to provide signal strength in excess of the minimum acceptable level to assure high quality, noise-free reception. To do so will require an unconventional radiation system for a road bed in which the energy level across each traffic lane strip is maximized while the signal on either side of the right of way is suitably attenuated, to comply with the F.C.C. requirements.

In addition, some states object, for aesthetic reasons, to highway radio communications systems in which the radiating antennas are positioned above the surface of the ground along the sides of the highway. Therefore the most favorable type of radio communication system would be one having its radiating antennas extending beneath the surface of the ground or beneath the surface of the highway, but none has ever been developed which complies with the F.C.C. requirements.

SUMMARY OF THE INVENTION

The present invention provides a sectionalized radio communication system for highways in which the radiating antenna elements of each section extend beneath the road surface and longitudinally of the road, with antenna elements serving each section of the road disposed on opposite sides of the road and/or between adjacent road lanes. All of the antenna elements for each section have radio communications signals produced therein by a common transmitter means and antenna feed phasing circuit whereby signals on adjacent radiating antenna elements are phase related to each other such that sufficient field strength is provided across the road to assure high quality noise-free radio reception in a vehicle traveling on the road, whether the vehicle antenna is on the right or left side of the vehicle, and the strength of the field outside the immediate vicinity of the road is attenuated to a level which satisfies the requirements of the Federal Communications Commission.

DESCRIPTION OF THE PREFERRED EMBODIMENTS

Figures 1, 4, 5, 6:
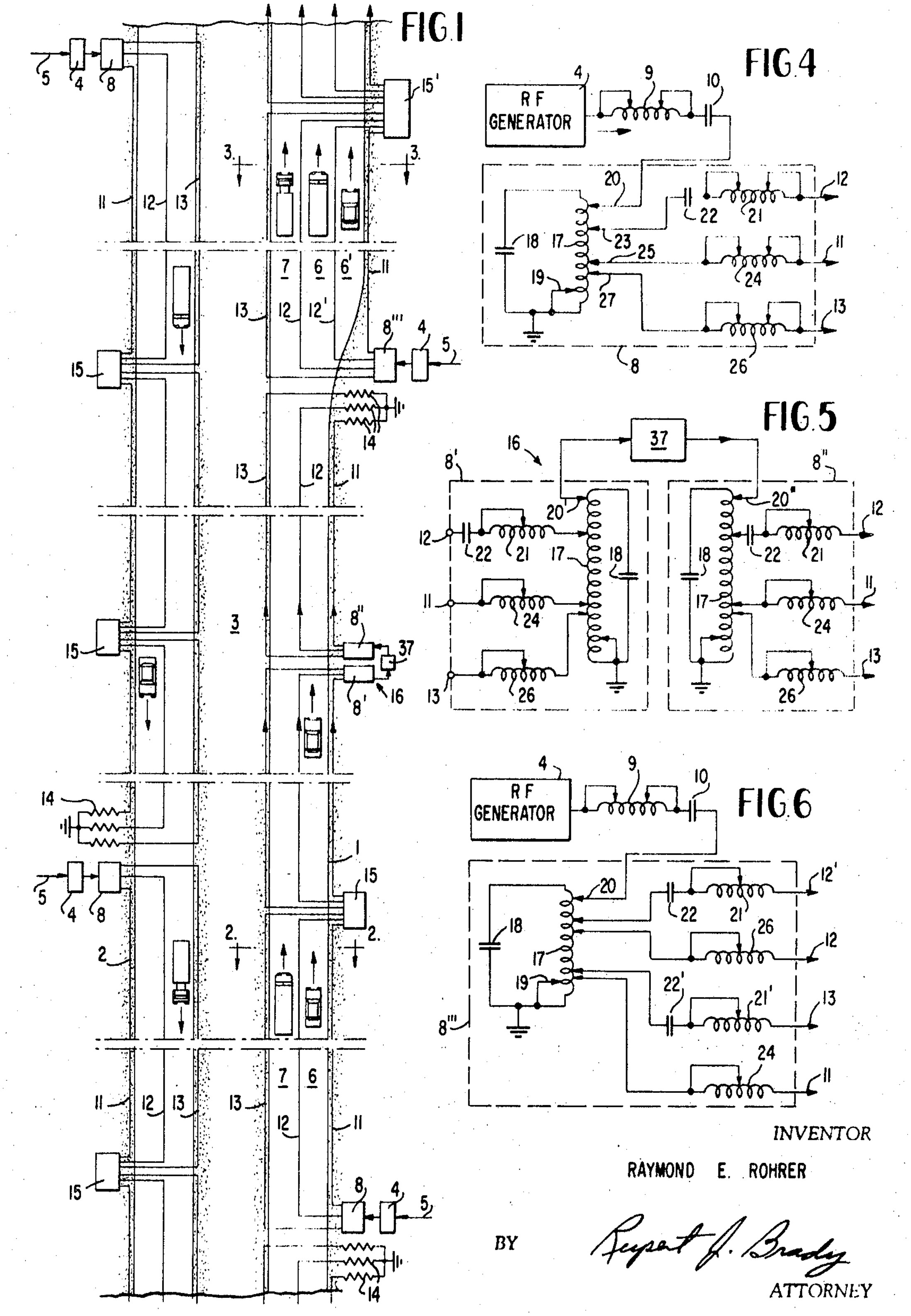
FIG. 1 is a top plan view of a divided plural lane highway schematically showing plural sections of the underground communication system of the invention, relative to the various road lanes.
FIG. 4 is an electrical schematic diagram of the transmitter and phasing circuit feeder system at the start of each system section on a two lane road.
FIG. 5 is an electrical schematic diagram of a modified form signal boosting circuit between adjacent subsections of a communication system section according to the invention.
FIG. 6 is an electrical schematic diagram similar to FIG. 4 but showing an antenna feed phasing circuit for a three lane road.

Referring to the drawings wherein like numerals designate like components, FIG. 1 illustrates a divided highway, embodying the communication system of the invention, including dual lane roadways 1 and 2, carrying vehicles in opposite directions and separated by a median 3. As illustrated, roadway 1, toward the top of the view, expands into a three lane highway. The radio communication system of the invention affords communications to vehicles traveling in a predetermined direction so that a separate radio communication system is provided for each of roadways 1 and 2. With this arrangement one message can be directed to vehicles traveling in one direction on the highway while a different message can be simultaneously transmitted to vehicles traveling in opposite direction, since the information of interest to vehicles on the opposite roadway would be different, since they are heading toward different locations. With the arrangement of the system of the invention, the electromagnetic radiation is substantially confined to the area of the particular roadway across which the electromagnetic communication field is established.

The system of each roadway 1 and 2 is also sectionalized so that a selected message can be transmitted to vehicles traveling along a selected section of the roadway, while a different message can be communicated to vehicles traveling along a different section of the same roadway. However, when desired, the same message can be transmitted to any selected number of sections of the same roadway or come to all sections of the roadway, depending upon the programming of the transmitters energizing each section of the communication system. For example, roadway 1 includes an RF generator or transmitter 4 operating in the broadcast band located on the side of the roadway and having a programming and transmitter control input 5 from a remote studio location, which input is supplied to transmitter 4 from the studio by phone lines, microwave transmission, two-way radio circuit, etc., not shown. Transmitter 4 controls a section of the communication system on a portion of roadway 1, having two traffic lanes 6 and 7. Transmitter 4 is connected to antenna feed phasing circuit 8 through variable inductance 9 and capacitor 10, FIG. 4. Phasing circuit 8, in turn, is connected to radiating antenna wires 11, 12 and 13 extending longitudinally of, and substantially parallel with, lanes 6 and 7, and substantially coextensive with each other. These antenna wires extend along roadway 1 for a predetermined distance and are each terminated in the usual transmission line manner by a resistor 14 of appropriate size connected between the terminating end of the respective antenna wire and ground. Radiating antenna wires 11, 12 and 13 are all disposed beneath the surface of the highway, that is buried, for example, approximately four to six inches under ground, with all of the antenna disposed substantially the same depth beneath the surface of the highway throughout their lengths and disposed in substantially the same horizontal plane. Radiating antenna wires 11 and 13 are preferably buried under ground along the edge of roadway 1 and radiating antenna wire 12 is disposed beneath the surface on roadway 1 intermediate lanes 6 and 7. While a pair only of antenna wires, such as 11 and 13, buried on opposite sides of a two lane road, will operate in the manner prescribed, it has been found more desirable in order to provide a more uniform signal strength across the highway to assure high quality, noise-free, radio reception, to provide an antenna wire on opposite sides of each traffic lane. Thus, in the preferred embodiment, for a two lane roadway, such as shown in FIGS. 1 and 2, one wire is disposed on each side of the roadway and one is disposed centrally of the roadway between the two traffic lanes 6 and 7.

The radiating antenna wires, served by a single transmitter 4, may extend along the roadway 1 for any desired distance, for instance, ten or twenty miles or other selected distance. For radiating antenna wires of such a length it is necessary to have signal amplifying means, such as indicated at 15 and 16, coupled to the antenna lines at selected distances, for example every one-half or one mile, to boost the signal level in each antenna line to maintain substantially the same signal level throughout the lengths of the antenna wires. Signal amplifying means 15 and 16 may be buried in the ground along the side of the roadway or may be stored on a pole above the surface of the ground along the side of the road. The lineal amplifier means are of standard construction that give no degradation of the communication signal currents in the radiating antenna wires 11, 12 and 13, and it is, therefore, possible to have as many amplifiers in a single section of the communication system as desired, to thus build up the signal in the antenna wires as many times as is necessary, depending upon the length of the lines or until a break in the system is necessary for sectionalizing purposes.

The antenna feed phasing circuit 8 consists of an inductor 17 and a capacity 18 connected to form a tank circuit, with the inductor being variable, as indicated at 19, to tune the tank circuit. The position of variable tap 20 on inductor 17, which connects transmitter 4, to the phasing circuit, through inductance 9 and capacitor 10, determines the resistive load of transmitter 4, while components 9 and 10 are adjusted in the normal manner to tune out any reactive component of the load such that only a resistive load is applied to the transmitter. Radiating antenna wire 12 is connected through variable inductance 21, capacitor 22, and adjustable tap 23, to inductor 17. In lieu of this combination of circuit components, a variable capacity alone could be utilized, but it has been found more economical to use a fixed capacitor and a variable inductance, as illustrated. Radiating antenna line 11 is connected to inductor 17 through variable inductor 24 and adjustable tap 25, and radiating antenna wire 13 is connected to inductor 17 through variable inductor 26 and adjustable tap 27.

Figure 2:
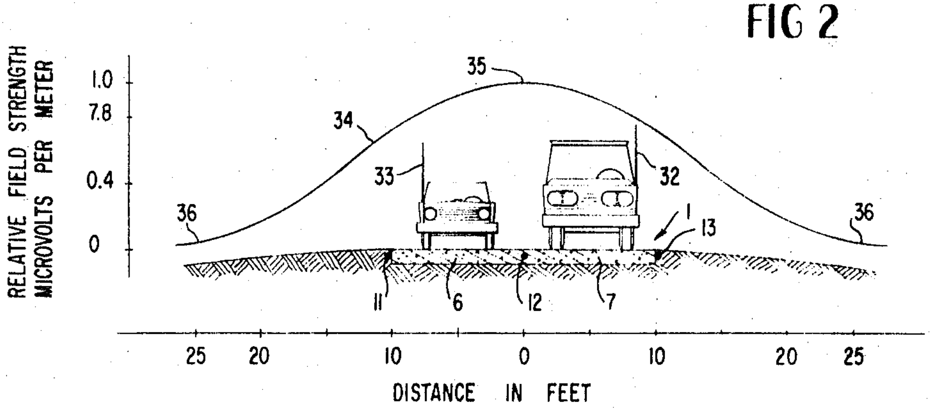
FIG. 2 is an enlarged cross-sectional view through a pair of lanes of the highway taken substantially along line 2—2 of FIG. 1, and having a communication field intensity graph superimposed thereon.
Figure 7:
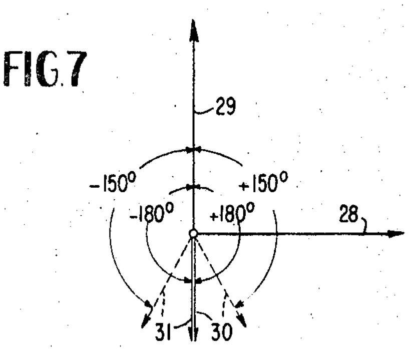
FIG. 7 is a schematic vector diagram illustrating the relative signal strength and phasing of the antenna signals for a two lane road.

Referring to the communication signal current vector diagram of FIG. 7, superimposed communication field intensity plot 34, of FIG. 2, where relative field strength in which the field is measured in microvolts per meter, is plotted against distance in feet from the center of the highway, vector 28 represents the input communication signal current from transmitter 4, vector 29 represents a communication signal current in radiating antenna wire 12 in the center of the highway, and vectors 30 and 31, respectively, represent the communication signal currents in radiating antenna wires 11 and 13. The position of adjustable taps 23, 25 and 27 on inductor 17 determine the relative magnitude of the communication signal current in the antenna wires 12, 11 and 13, respectively. In order to obtain high quality noise-free radio reception for vehicles of all types in both lanes 6 and 7, whether they have the antenna on the driver's side of the vehicle, as indicated at 32, or on the opposite side of the vehicle, as indicated at 33, a substantially uniform communication field strength is required across both lanes. To obtain the highest quality field the signal current in radiating antenna wire 12 should be approximately twice the magnitude of the communication signal current in either antenna wire 11 or antenna wire 13. The magnitude of communication signal currents in antenna wires 11 and 13, as indicated by vectors 30 and 31, are in the range of 0.3 to 0.7 of the magnitude of the communication signal current in antenna wire 12, and the most favorable operating range of currents in lines 11 and 13 is 0.4 to 0.6 of the magnitude of the current in antenna wire 12. The currents in antenna wires 11 and 13 are thus substantially the same and for this reason adjustable taps 25 and 27 are positioned relatively close to each other on inductor 17 on substantially adjacent turns thereof. Adjustable tap 23 is positioned higher on the inductor to provide maximum power for the center antenna wire 12.

Components 21 and 22, or alternately, a variable capacitance (not shown) provide a current 29 (FIG. 7) in antenna wire 12 which leads the input current 28, while variable inductors 24 and 26 in the circuits of antenna wires 11 and 13, respectively, provide currents 30 and 31, respectively in these lines which lag input current 28. The important phasing of the currents, in the various lines, is the phasing of currents 30 and 31 relative to current 29 in antenna wire 12. For proper operation, it has been found that the phase of current 30 in antenna 11 is in the range of $+150°$ to $+180°$ relative to current 29 in antenna 12 and the phase of current 31 in antenna 13 is in the range of $-150°$ to $-180°$ relative to current 29, or vice versa. The optimum phasing ranges of currents 30 and 31 relative to current 29 in center antenna 12 are $+165°$ to $+180°$ and $-165°$ to $-180°$, respectively, or vice versa. With this arrangement, a desired 680–700 microvolts per meter signal strength can be obtained at the center of the roadway, as indicated at 35, on relative field strength plot 34, and maintain the field strength 100 feet away from the outer radiating antenna wires 11 and 13 on opposite sides of the road within the 37.8 microvolts per meter permissible. Experience has shown that the field away from the highway is reduced to this permissible level well before the 100 foot limitation, as indicated at 36 on relative field strength curve 34.

Signal amplifying means 15, in its simplest form, may be a three section amplifier of the usual type where each of the antenna wires 11, 12 and 13 is connected to an individual section of the three section amplifier. Three section type amplifiers 15 can be connected at plural points along the length of each section of the communication system as indicated in the system schematic of roadway 2, in FIG. 1, as long as the road is a two lane road. The signal amplifying means illustrated at 16, in FIGS. 1 and 5, is a modified form of amplifying means which may be utilized instead of the three section type amplifiers at 15. In this form the three antenna wires 11, 12 and 13 at the end of a system subsection are connected to a phasing circuit 8′ constructed in the same manner as phasing circuit 8, where it functions as a phase combining network. The single communication signal output current from this circuit is fed through tap 20′ to a single amplifier 37, from which the signal is fed through tap 20″ into an antenna feed and phasing circuit 8″, similar to and which functions the same as circuit 8, a phase splitting network. The outputs of circuit 8″ are connected to the antenna wires 11, 12 and 13 of the next subsection, producing the same signal magnitude and phase relation in the antenna as at the start of the system section.

Figure 8:
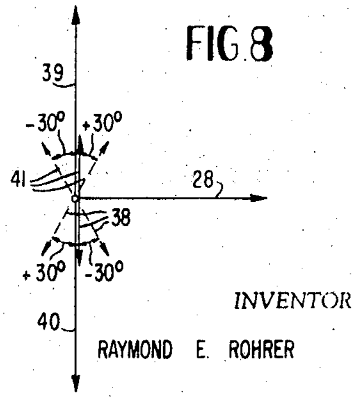
FIG. 8 is a schematic view of a vector diagram illustrating the relative signal strength and phasing of the antenna signals for a three lane road.

As illustrated in FIG. 1, that portion of roadway 1 which broadens into three traffic lanes 6′, 6 and 7 is served by a separate section of the sectionalized communication system of the invention. For the three lane roadway four radiating antenna wires 11, 12′, 12 and 13 are utilized, with antenna wires 11 and 13 located underground along the edge of the roadway as before, and antenna wires 12′ and 12 located beneath the roadway surface between lanes 6′, 6 and 6, 7, respectively. An externally controlled radio frequency generator or transmitter 4 of the same type that supplies the two lane road section, in combination with antenna feed phasing circuit 8‴, supplies radio communication signal currents 38, 39, 40 and 41, as indicated on the vector diagram of FIG. 8, to radiating antenna wires 11, 12′, 12 and 13, respectively. Antenna feed phasing circuit 8‴ is of generally the same construction as circuit 8, as shown in FIG. 6, except that it supplies the proper signal current magnitude and phasing to four antenna wires instead of three antenna wires. Such a phasing circuit can supply any number of radiating antenna wires for any number of traffic lanes and such an arrangement for a two lane three antenna wire system, and a three lane four antenna wire system, are shown for purposes of illustration only, but in all systems, no matter what number of antenna wires are used, the phasing circuit supplies communication signal currents on adjacent antenna wires substantially out of phase with each other. The relative magnitudes of the signals on the various antenna wires varies in accordance with the number of antennae in the system.

Figure 3:
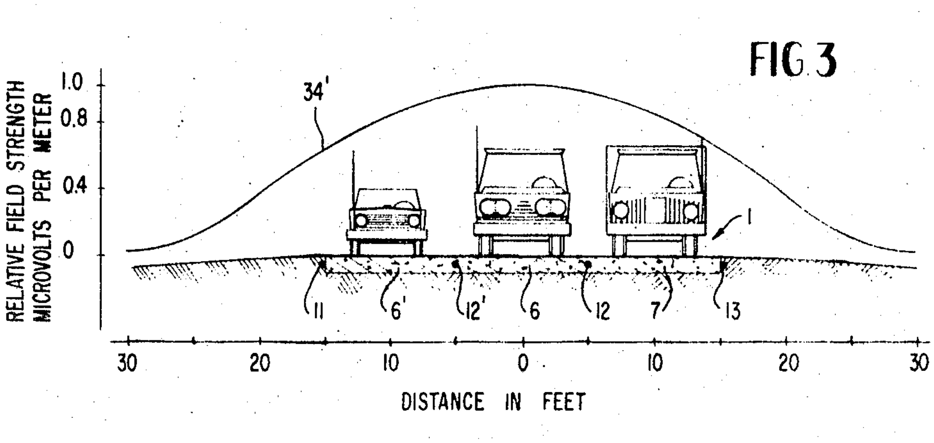
FIG. 3 is an enlarged cross-sectional view similar to FIG. 3, taken substantially along line 3—3 of FIG. 1 and schematically illustrating the relative field intensity distribution of the system across a three lane road.

To establish a substantially uniform electromagnetic communication field across the roadway as indicated in the field strength graph 34′ of FIG. 3, a leading communication signal current 39 is supplied to antenna wire 12′ by the variable inductance 21 and fixed capacitor 22 components, or alternately through a variable capacitor (not shown) in circuit 8‴, while a lagging signal current of substantially the same magnitude is supplied to antenna wire 12 through variable inductance 26. The currents 39 and 40 in the two center antenna wires 12′ and 12 are thus substantially equal and opposite in magnitude and phase. A lagging current 38 of a magnitude of approximately one-third the current magnitude 39 and 40, is produced in antenna wire 11 by variable inductor 24. Current 38 in wire 11 is substantially out of phase with current 39 in wire 12′, but for operation the phase of current 38 may be in the range of $\pm 30°$ from the 180° out of the phase position of current vector 38 relative to current vector 39. In like manner a leading current 41 of a magnitude of approximately one-third the current magnitude 39 and 40, is produced in antenna wire 13 by variable inductor 21′ and fixed capacitor 22′, or alternately by a variable capacitor (not shown). Current 41 in wire 13 is substantially out of phase with current 40 in wire 12, but for operation the phase of current 41 may be in the range of $\pm 30°$ from the 180° out of phase position of current vector 41 relative to current vector 40. Current vectors 38 and 41 are preferably in the range of $\pm 15°$ from their 180° out of phase position with current vectors 39 and 40, respectively.

To obtain the required field strengths at the various locations, the magnitudes of currents 38 and 41 may vary in the range of $\pm 50\%$ from the one-third magnitude relation with the magnitude of the currents 39 and 40, but preferably fall within the range of $\pm 20\%$.

For the four antenna wire system a four section amplifier 15′ is connected intermediate each subsection of antenna wires 11, 12′, 12 and 13 in the same manner as described relative to amplifier 15. Similarly, the combination of a simple amplifier, a four wire phase combining network, and a four wire phase splitting network, similar to circuit 8‴, can be used between subsections of the system in the same manner as the circuit shown at 16 in FIG. 5.

By way of example the radiating antenna wires may be No. 10 insulated wire, such as the type coated with some type of plastics material. Typical values for the components in the phasing network 8, 8′, etc., are 60 $\mu$h. for inductors 17, 21, 24 and 26, .002 $\mu$fd. for capacitor 22, and .005 $\mu$fd. for capacitor 18.

As indicated, in the graphs of FIGS. 2 and 3, approximately 0.7 of the maximum communication field strength is the minimum field strength obtained at any point across the roadway so the system provides a relatively uniform field across the entire width of the highway, while it rapidly approaches 0 within a relatively short distance from the roadway. This is the result of the phase relation of the signals in the antenna wires and the attenuating effect from the antenna wires being buried in the ground.

While the invention has been shown and described in certain preferred embodiments it is realized that modifications can be made without departing from the spirit of the invention, and it is understood that no limitations on the invention are intended other than those imposed by the scope of the appended claims.

I claim:

1. A highway radio communication system for transmitting a radio communication signal to vehicles traveling along the highway comprising, a radio communications transmitter means having an input signal coupled thereto from a signal source, at least a pair of radiation antenna means coupled to said radio communications transmitter means for radiating a communication signal to the vehicle, said radiation antenna means extending longitudinally of and beneath the surface of the highway, said pair of radiation antenna means located substantially parallel to and on opposite sides of the path of travel of vehicles on the highway, phasing means connected between said radiation antenna means and said radio communications transmitter means, and communication signals produced in opposite radiation antenna means of said pair in substantial phase opposition to each other by said transmitter means and phasing means, whereby communication signals of predetermined level are confined to the immediate vicinity of the highway and attenuated to a predetermined level outwardly of the highway.

2. A highway radio communication system as set forth in claim 1, in which said radiation antenna means extend a predetermined distance along the highway, and including communication signal amplifier means connected intermediate the ends of each of said radiation antenna means to boost the strength of said communication signals to a predetermined level.

3. A highway radio communication system as set forth in claim 1, in which said radiation antenna means are located a substantially uniform predetermined depth substantially throughout the lengths thereof beneath the surface of the highway.

4. A highway radio communication system as set forth in claim 1 in which said radiation antenna means extend a predetermined distance along the highway; and including second phasing means; signal amplifier means; and third phasing means; said second phasing means, said signal amplifier means and said third phasing means connected in a series circuit; and said series circuit commonly connected intermediate the ends of all said radiation antenna means to maintain the strength of said communication signals at a predetermined level substantially throughout the lengths of said radiation antenna means.

5. A highway radio communication system as set forth in claim 1, in which said radiation antenna means comprise three substantially coextensive radiating antenna wires for a highway with two traffic lanes, one antenna wire disposed on each side of the highway and the third antenna wire disposed in said highway between the two traffic lanes, and the communication signal currents in each antenna wire on each side of said highway substantially out of phase with the communication signal current in said third antenna wire.

6. A highway radio communication system as set forth in claim 5 in which said communication signal currents in said antenna wires on each side of said highway are phased in the ranges of +150° to +180° and −150° to −180°, respectively, relative to said communication signal current in said third antenna wire.

7. A highway radio communication system as set forth in claim 6 in which the combined magnitudes of said communication signal currents in said antenna wires on each side of said highway are approximately equal to the magnitude of said communication signal current in said third antenna wire.

8. A highway radio communication system as set forth in claim 5, in which said communication signal currents in said antenna wires on each side of said highway are phased in the ranges of +165° to +180° and −165° to −180°, respectively, relative to said communication signal current in said third antenna wire.

9. A highway radio communication system as set forth in claim 1 in which said radiation antenna means on a three lane highway comprise first and second radiating antenna wires disposed on opposite sides of the highway, and third and fourth radiating antenna wires disposed in said highway between the respective three lanes, the communication signal currents in said third and fourth radiating antenna wires being substantially out of phase with each other, and the communication signal currents in said first and second radiating antenna wires substantially out of phase with the communication signal currents in the adjacent third and fourth radiating antenna wires, respectively.

10. A highway radio communication system as set forth in claim 9, in which said communication signal currents in said third and fourth radiating antenna wires are substantially out of phase with each other.

11. A highway radio communication system as set forth in claim 9, in which said first radiating antenna wire is disposed adjacent said third radiating antenna wire and said second radiating antenna wire is disposed adjacent said fourth radiating antenna wire, said communication signal current in said first radiating antenna wire being in the range of ±30° from the out of phase relation with the communication signal current in said third radiating antenna wire, and said communication signal current in said second radiating antenna wire being in the range of ±30° from the out of phase relation with the communication signal current in said fourth radiating antenna wire.

12. A highway radio communication system as set forth in claim 9, in which said first radiating antenna wire is disposed adjacent said third radiating antenna wire and said second radiating antenna wire is disposed adjacent said fourth radiating antenna wire, said communication signal current in said first radiating antenna wire being in the range of ±15° from the out of phase relation with the communication signal current in said third radiating antenna wire, and said communication signal current in said second radiating antenna wire being in the range of ±15° from the out of phase relation with the communication signal current in said fourth radiating antenna wire.

13. A highway radio communication system as set forth in claim 11, in which the magnitudes of said communication signal currents in said third and fourth radiating antenna wires are substantially equal, and the communication signal currents in said first and second radiating antenna wires are one third ±50% the magnitude of the communication signal currents in said third and fourth radiating antenna wires.

14. A highway radio communication system as set forth in claim 1 in which said radiation antenna means comprise individual insulated radiating antenna wires, substantially coextensive with each other, and disposed substantially in the same horizontal plane.

References Cited

UNITED STATES PATENTS

| | | | |
|---|---|---|---|
| 1,683,716 | 9/1928 | Espenschied | 179—82 |
| 2,280,461 | 4/1942 | Whisk | 179—82 |
| 3,323,063 | 5/1967 | Walker | 325—51 |
| 2,980,793 | 4/1961 | Daniel | 325—133 |

ROBERT L. GRIFFIN, Primary Examiner

A. J. MAYER, Assistant Examiner

U.S. Cl. X.R.

179—82; 325—28; 343—719